United States Patent [19]

van Abeelen et al.

[11] Patent Number: 4,748,203

[45] Date of Patent: May 31, 1988

[54] POLYMER MIXTURE WITH PC AND HIPS

[75] Inventors: Petrus C. A. M. van Abeelen, Bergen op Zoom; Johannes W. J. de Munck, Huybergen, both of Netherlands

[73] Assignee: General Electric Company, Mt. Vernon, Ind.

[21] Appl. No.: 23,053

[22] Filed: Mar. 6, 1987

[30] Foreign Application Priority Data

Mar. 17, 1986 [NL] Netherlands .......................... 8600671

[51] Int. Cl.$^4$ ............................................. C08L 69/00
[52] U.S. Cl. ........................................ 525/67; 525/92; 525/146; 525/148
[58] Field of Search .................... 525/67, 92, 146, 148

[56] References Cited

U.S. PATENT DOCUMENTS

| | | | |
|---|---|---|---|
| 4,111,895 | 9/1978 | Gergen et al. ..................... | 525/92 X |
| 4,409,363 | 10/1983 | Brandstetter et al. ................ | 525/67 |
| 4,584,338 | 4/1986 | Liu ..................................... | 524/504 |

*Primary Examiner*—Theodore E. Pertilla
*Attorney, Agent, or Firm*—Martin B. Barancik

[57] ABSTRACT

The invention relates to polymer mixtures which comprise an aromatic polycarbonate and a rubber-modified polystyrene. The polystyrene used is characterized by a particular structure: a polystyrene matrix having dispersed therein rubber-like particles with a capsule morphology and an average particle size from 0.2 to 0.6 micrometers.

19 Claims, No Drawings

POLYMER MIXTURE WITH PC AND HIPS

The invention relates to a polymer mixture which comprises an aromatic polycarbonate and a rubber-modified polystyrene.

Polymer mixtures which comprise an aromatic polycarbonate and a rubber-modified polystyrene are known from WO-A No. 80/00027 and EP-A No. 0058929. The rubber-modified polystyrene as described in the examples of EP-A No. 0058929 has an average particle size of the "Weichkomponente" (soft-component) of 2–3 micrometers.

The invention provides polymer mixtures as described hereinbefore and having improved mechanical properties, in particular having a greater ductility.

The polymer mixture according to the invention is characterized in that it comprises a rubber-modified polystyrene built up from a polystyrene matrix having rubber-like particles uniformly distributed therein of (co)polymerisates built up substantially of 1,3-dienes with a capsule particle morphology, the particles having an average particle size ($d_{50}$-value of the integral mass distribution) of 0.2–0.6 micrometers.

The polymer mixtures according to the invention may comprise 1–99% by weight, preferably 50–99% by weight of aromatic polycarbonate and 99–1% by weight, preferably 1–50% by weight, of rubber-modified polystyrene calculated with respect to the sum of the polycarbonate and the polystyrene.

In addition to the constituents mentioned hereinbefore, the polymer mixture according to the invention may comprise an agent to improve the impact strength. By adding such an agent, a noticeable improvement of the notch impact strength is obtained, even when a comparatively small quantity of, for example, 1–5 parts by weight per 100 parts by weight of aromatic polycarbonate plus polystyrene is added.

The polymer mixture according to the invention may moreover comprise an agent to improve the bonding between the aromatic polycarbonate and the rubber-modified polystyrene. The use of such agents presents the advantage that the temperature at which the fracture behaviour changes from ductile to brittle (the so-called ductile-brittle transition temperature) is moved to lower values. As an agent to improve the bonding is preferably used a styrene polymer with free carboxyl groups obtained by polymerisation in the presence of an unsaturated carboxylic acid monomer.

The polymer mixtures according to the invention may be manufactured according to the conventional techniques of preparing polymer mixtures, for example, by means of mixers and extruders. The polymer mixtures may be further processed according to the methods conventionally used for thermoplastic materials, for example, injection moulding, extrusion, and blow moulding. A combination of such methods may also be used, for example, extrusion-blow-moulding.

The polymer mixture according to the invention comprises at any rate the following two constituents:
A. an aromatic polycarbonate and
B. a rubber-modified polystyrene.

A. Aromatic polycarbonate

Aromatic polycarbonates are materials known per se. They are generally prepared by reacting a dihydric phenol compound with a carbonate precursor, for example, phosgene, a halogen formiate or a carbonate ester. Aromatic polycarbonates are polymers which comprise units of the formula

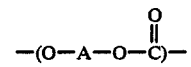

wherein A is a bivalent aromatic radical which is derived from the dihydric phenol which is used in the preparation of the polymer. The polycarbonates used generally have an intrinsic viscosity of approximately 0.30 to approximately 1.00 dl/g (measured in methylene chloride at 25° C.). As dihydric phenols may be used in the preparation of the aromatic polycarbonates mononuclear or polynuclear aromatic compounds which comprise two hydroxy radicals which are each linked directly to carbon atom of an aromatic nucleus.

Examples of suitable dihydric phenols are: 2,2-bis-(4-hydroxyphenyl)propane; hydroquinone; resorcinol; 2,2-bis(4-hydroxyphenyl)pentane; 2,4'-(dihydroxyphenyl)methane; bis-(2-hydroxyphenyl)methane; bis-(4-hydroxyphenyl)methane; bis-(4-hydroxy-5-nitrophenyl) methane; 1,1-bis(4-hydroxyphenyl)ethane; 3,3-bis(4-hydroxyphenyl)pentane; 2,2-dihydroxyphenyl; 2,6-dihydroxynaphthalene; bis-(4-hydroxydiphenyl)sulphone; bis-(3,5-diethyl-4-hydroxyphenyl)sulphone; 2,2-bis-(3,5-dimethyl- 4-hydroxyphenyl)propane; 2,4'-dihydroxyphenyl sulphone; 5'-chloro-2,4—dihydroxydiphenyl sulphone; bis-(4-hydroxyphenyl)diphenyl sulphone; 4,4'-dihydroxydiphenyl ether; 4,4'-dihydroxy-3,3-dichlorodiphenyl ether; 4,4'-dihydroxy-2,5-dihydroxydiphenyl ether.

Other, likewise suitable, dihydric phenols are disclosed in U.S. Pat. Nos. 2,999,835; 3,038,365; 3,334,154, and 4,131,575.

The aromatic polycarbonates can be prepared in a manner known per se: for example, by reacting a dihydric phenol with a carbonate precursor, for example, phosgene. For this purpose there may be referred to the U.S. patent specifications just mentioned and to U.S. Pat. Nos. 4,018,750 and 4,123,426. They may also be prepared by a transesterification as described in U.S. Pat. No. 3,153,008.

The known branched polycarbonates as described, for example, in U.S. Pat. No. 4,001,184 are also suitable.

Suitable aromatic polycarbonates are also the so-called polyester carbonates which are obtained by performing the polymerisation reaction in the presence of an ester precursor, for example, a difunctional carboxylic acid, for example, terephthalic acid or an ester-forming derivative thereof. These polyester carbonates have ester bonds and carbonate bonds in the polymeric chain. Polyester carbonates are described, for example, in U.S. Pat. No. 3,169,121.

It is also possible in the polymer mixture according to the invention to use a mixture of different polycarbonates as mentioned hereinbefore as an aromatic polycarbonate.

B. Rubber-modified polystyrene

The polymer mixture according to the invention comprises a rubber-modified polystyrene of a particular type, namely a rubber-modified polystyrene built up from a polystyrene matrix with uniformly distributed therein rubber-like particles of (co)polymerisates built up substantially of 1,3-dienes with a capsule particle morphology, the particles having an average particle size ($d_{50}$-value of the cumulative mass distribution) of 0.2–0.6 micrometers.

Average particle size is to be understood to mean the average particle diameter of the $d_{50}$-value of the cumulative mass distribution. The actual determination of the particle size is carried out according to a method known per se by measuring the particles in electron micrograph (see F. Lenz, Zeitschrift für wissenschaftliche Mikroskopie, 63 (1956), 50–56). The rubber-like copolymerisate must have a so-called capsule particle morphology. In Angew.Makromolekulare Chemie 58/59 (1977), pp. 175–198 the said morphology and the way in which this can be obtained are described.

In the rubber-modified polystyrene, the content of rubber-like particles, corresponding to the content of gel phase or soft component, is preferably 3–30% by weight caculated with respect to the quantity of rubber-modified polystyrene.

The (co)polymerisate present in the rubber-like particles usually consists of polybutadiene or a butadiene-styrene copolymer or block copolymer.

Polystyrene is to be understood to include not only the homopolymers of styrene, but all polymers or copolymers which are built up for more than 50 mol. % from vinylaromatic monomers, for example, styrene and styrene compounds substituted in the nucleus or in the side chain with halogen atoms or lower alkyl groups. The polystyrene may be a copolymer obtained by polymerization of styrene monomer in the presence of one or more further copolymerizable monomers such as acrylonitrile. Such copolymerizable monomers can be present in a quantity of up to 49 mol % for example up to 40 mol %.

The polymer mixture according to the invention may moreover comprise one or more compounds selected from the following groups of compounds:

(C) agents to improve the impact strength, and/or
(D) agents to improve the bonding between the aromatic polycarbonate and the rubber-modified polystyrene and/or
(E) conventional additives for thermoplastic synthetic resins.

C. Agents to improve the impact strength

As agents to improve the impact strength may be mentioned, for example, vinylaromatic polybutadiene di- or triblock copolymers. These block copolymers may be non-hydrogenated or be partially hydrogenated. Partially hydrogenated or non-hydrogenated linear styrene-butadiene di- or triblock copolymers or also the partially hydrogenated or non-partially hydrogenated radial styrene-butadiene block copolymers may be mentioned by name.

Further suitable agents are, for example, the so-called core-shell polymers. These polymers are built up from a rubber-like core, for example, predominantly of an acrylate rubber or a diene rubber around which one or more shells of rigid thermoplasts are provided. The shell may be prepared, for example, from styrene and/or acrylonitrile and/or alkylmethacrylates.

Further suitable agents are ABS, ASA, MBS, APM, EDPM and the like. The use of MBS in polymer mixtures which comprise an aromatic polycarbonate and a polystyrene is known per se from WO No. 80/00027.

D. Agents to improve the bonding between aromatic polycarbonate and rubber-modified polystyrene The polymer mixture according to the invention may also comprise an agent to improve the bonding between aromatic polycarbonate and the rubber-modified polystyrene. Unexpectedly it has been found that the generally known, commercially available agents to improve the bonding between polystyrene and other thermoplasts such as PVC; PA; PE; PP and the like are also suitable to improve the bonding between the aromatic polycarbonate and the rubber-modified polystyrene. This better bonding results in a shift of the transition temperature between brittle and ductile fracture behaviour towards lower temperatures.

These known means to improve the bonding between various polymers usually consist of one or more polymers and/or copolymers which on the one hand are built up from units derived from a vinylaromatic compound, for example, styrene, and on the other hand units derived from a monomer with free carboxyl groups such as maleic acid anhydride, acrylic acid and/or methacrylic acid. In addition these agents may comprise polymers with units derived from acrylate esters. Agents of this type are disclosed, for example, in the following patent publications: BE No. 833–803; DE-A No. 2236903; DE-A No. 2029028; DE-A No. 2703078 and DE-A No. 2753697. They are marketed by the BASF Aktiengesellschaft, for example, under the indications KR 2680; KR 2681; KR 2682; KR 2683; KR 2684 and KR 2685.

E. Conventional additives for thermoplastic synthetic resins

In addition to the above-mentioned constituents, the polymer mixture according to the invention may comprise one or more of the conventional synthetic resins, for example, fillers, reinforcing fibres, for example, glass fibres, mould release agents, flame retarding agents, pigments, dyes, stabilizers.

The invention will now be described in greater detail with reference to the ensuing specific examples: Examples I, II and III and comparative examples A, B and C.

Six different polymer mixtures were prepared having compositions as indicated in table A hereinafter. In all six polymer mixtures, an aromatic polycarbonate was used derived from 2,2-bis-(4-hydroxyphenyl)-propane and phosgene with intrinsic viscosity of 51 ml/g measured in methylene chloride at 25° C. In the comparative examples B and C, a first rubber-modified polystyrene (HIPS I) was used having a particle size of the rubber-like particles of approximately two micrometers and with a usual morphology (salami structure). In examples I, II and III according to the invention, a second rubber-modified polystyrene (HIPS II) was used with a capsule morphology and with a particle size of the rubber-like particles of approximately 0.3 micrometers. The polymer mixtures were prepared by dry-mixing the constituents mentioned in table A (in comparative example A only the polycarbonate) and extruding at 280° C. The formed extrudate was reduced to pellets. The pellets were formed in an injection moulding machine (at approximately 300° C.) to a number of standard test rods for determining ⅛ inch (3.2 mm) notched Izod impact value (ASTM D 256). The values found for the notched Izod impact strength are also recorded in Table A.

TABLE A

| Composition (parts by weight) | Example | | | | | |
|---|---|---|---|---|---|---|
| | I | II | III | A | B | C |
| Aromatic polycarbonate | 98 | 80 | 60 | 100 | 98 | 80 |
| HIPS I* | — | — | — | — | 2 | 20 |
| HIPS II** | 2 | 20 | 40 | — | — | — |
| Properties | | | | | | |
| Izod impact (J/m) | 710 | 410 | 400 | 800 | 630 | 250 |

*particle size 2 micrometers; salami structure
**particle size 0.3 micrometers; capsule morphology.

It may be seen from Table A that the addition of a small quantity of rubber-modified polystyrene to polycarbonate leads to a decrease of the Izod impact strength (compare example A with Example I and example B). By comparing Example I with example B and Example II with example C it will be obvious that the use of a rubber-modified polystyrene with a particle size of 0.3 micrometers and a capsule morphology (HIPS II) results in a better Izod impact strength than the use of the conventional rubber-modified polystyrene (HIPS I).

EXAMPLE IV TO IX

Six different polymer mixtures were prepared starting from the same aromatic polycarbonate and the same HIPS II (rubber-modified polystyrene with a capsule morphology having an average particle size of 0.3 micrometers) as in the Examples I, II and III. Moreover, an agent to improve the impact strength was added to each of the six polymer mixtures: in Examples IV and V a partially hydrogenated styrene-butadiene-styrene triblock copolymer (Kraton G 1650); in Examples VI and VII an ethylene-propylene rubber (BA-616); in Examples VIII and IX a methyl methacrylate-butadiene-styrene polymer (MBS-Acryloid¼ of Rohm and Haas Company, U.S.A.).

The polymer mixtures and the test rods were prepared in the same manner as in the Examples I to III.

The composition of the polymer mixtures, as well as the Izod impact value are recorded in Table B hereinafter.

TABLE B

| Composition (parts by weight) | Example | | | | | | |
|---|---|---|---|---|---|---|---|
| | III | IV | V | VI | VII | VIII | IX |
| Polycarbonate | 60 | 58 | 56 | 58 | 56 | 58 | 56 |
| HIPS II | 40 | 40 | 40 | 40 | 40 | 40 | 40 |
| Triblock copolymer | — | 2 | 4 | — | — | — | — |
| Ethylene-propylene rubber | — | — | — | 2 | 4 | — | — |
| MBS | — | — | — | — | — | 2 | 4 |
| Properties | | | | | | | |
| Izod impact (J/m) | 400 | 420 | 430 | 470 | 580 | 500 | 500 |

It may be seen from a comparison of Examples IV to IX with Example II that the addition of a comparatively small quantity of a thermoplastic rubber leads to an improvement of the Izod impact strength.

EXAMPLES X, XI and XII

Three polymer mixtures were prepared starting from the same aromatic polycarbonate and HIPS II as used in Example I. Moreover, in Examples XI and XII an agent to improve the bonding between the aromatic polycarbonate and the rubber-modified polystyrene was used. In Examples XI and XII a polymer mixture on the basis of a styrene-maleic acid anhydride with a little methacrylate (bonding agent 1). Bonding agent 1 is commercially available (HV-KR 2680 from BASF aktiengesellschaft).

The polymer mixtures were extruded at 300° C. and injection moulded at 300° C. The Izod impact strength of he rods was determined at 23° C.; 0° C. and −10° C. The composition ofthe polymer mixtures and the Izod impact strength are recorded in Table C below.

TABLE C

| Composition (parts by weight) | Example | | |
|---|---|---|---|
| | X | XI | XII |
| Polycarbonate | 80 | 80 | 80 |
| HIPS II | 20 | 19 | 18 |
| Bonding agent 1 | — | 1 | 2 |
| Properties | | | |
| Izod impact* (J/m) | | | |
| 23° C. | 620 | 780/530 | 800/550 |
| 0° C. | 200 | 680/300 | 680/320 |
| −10° C. | 145 | 300 | 650/320 |

*The Izod impact value was always determined of a number a rods. For large differences, the minimum value and the maximum value as found are recorded.

It may be seen from the values of Table C that the addition of a bonding agent results in a better value for the Izod impact value at lower temperature.

We claim:

1. A polymer mixture which comprises an aromatic polycarbonate and rubber-modified polystyrene, characterized in that the polymer mixture comprises a rubber-modified polystyrene built up from a polystyrene matrix having uniformly distributed therein rubber-like particles of (co)polymerisates built up substantially from 1,3-dienes with a capsule particle morphology in whihc the particles have an average particle size ($d_{50}$-value of the cumulative mass distribution) from 0.2 to 0.6 micrometres, said polystyrene essentially free of acrylonitrile.

2. A polymer mixture as claimed in claim 1, characterized in that the polymer mixture comprises 1–99% by weight of aromatic polycarbonate and 99–1% by weight of rubber-modified polystyrene calculated with respect to the sum of the polycarbonate and the polystyrene.

3. A polymer mixture as claimed in claim 1, characterized in that the polymer mixture comprises a rubber-modified polystyrene with 3–30% by weight of rubber-like particles calculated with respect to the overall quantity of rubber-modified polystyrene.

4. A polymers mixture as claimed in claim 2, characterized in that the polymer mixutre comprises a rubber modified polystyrene with 3–30% by weight of rubber like particles calculated with respect to the overall quantity of rubber modified polystyrene.

5. A polymer mixture as claimed in claim 1, characterized in that the polymer mixture further comprises an agent to improve the impact strength.

6. A polymer mixture as claimed in claim 2, characterized in that the polymer mixture further comprises an agent to improve the impact strength.

7. A polymer mixture as claimed in claim 3, characterized in that the polymer mixture further comprises an agent to improve the impact strength.

8. A polymer mixture as claimed in claim 4, characterized in that the polymer mixture further comprises an agent to improve the impact strength.

9. A polymer mixture as claimed in claim 1, characterized in that the polymer mixture further comprises an agent to improve the bonding between the aromatic polycarbonate and the rubber modified polystyrene.

10. A polymer mixture as claimed in claim 5, characterized in that the polymer mixture further comprises an agent to improve the bonding between the aromatic polycarbonate and the rubber modified polystyrene.

11. A polymer mixture as claimed in claim 7, characterized in that the polymer mixture further comprises an agent to improve the bonding between the aromatic polycarbonate and the rubber modified polystyrene.

12. A polymer mixture as claimed in claim 9, characterized in that the polymer mixture comprises as an agent to improve the bonding a sytrene polymer with free carboxyl groups obtained by polymerization in the presence of an unsaturated carboxylic acid monomer.

13. A polymer mixture as claimed in claim 10, characterized in that the polymer mixture comprises as an agent to improve the bonding a sytrene polymer with free carboxyl groups obtained by ppolymerization in the presence of an unsaturated carboxylic acid monomer.

14. A polymer mixture as claimed in claim 11, characterized in that the polymer mixture comprises as a agent to improve the bonding a sytrene polymer with free carboxyl groups obtained by polymerization in the presence of an unsaturated carboxylic acid monomer.

15. Articles formed from the polymer mixture as claimed in claim 1.

16. Articles formed from the polymer mixture as claimed in claim 3.

17. Articles formed from the polymer mixture as claimed in claim 7.

18. Articles formed from the polymer mixture as claimed in claim 9.

19. Articles formed from the polymer mixture as claimed in claim 11.

* * * * *